(12) United States Patent
Conoval

(10) Patent No.: US 6,400,903 B1
(45) Date of Patent: Jun. 4, 2002

(54) REMOTE CAMERA RELAY CONTROLLER METHOD AND APPARATUS

(76) Inventor: Paul Conoval, 2260 Cedar Cove Ct., Reston, VA (US) 20191

( * ) Notice: Subject to any disclaimer, the term of this patent is extended or adjusted under 35 U.S.C. 154(b) by 0 days.

(21) Appl. No.: 09/681,079

(22) Filed: Dec. 22, 2000

Related U.S. Application Data

(60) Provisional application No. 60/173,021, filed on Dec. 23, 1999.

(51) Int. Cl.[7] .......................... G03B 17/38; H04N 17/14
(52) U.S. Cl. .......................... 396/56; 396/396; 396/263; 348/17
(58) Field of Search .............................. 396/56, 57, 58, 396/59, 502, 263, 264, 265; 348/375, 17, 13

(56) References Cited

U.S. PATENT DOCUMENTS

| | | | |
|---|---|---|---|
| 5,111,498 A | | 5/1992 | Guichard et al. |
| 5,281,988 A | | 1/1994 | Martin |
| 5,325,143 A | * | 6/1994 | Kawano ...................... 396/59 |
| 5,418,567 A | * | 5/1995 | Boers et al. ................ 348/375 |
| 5,442,512 A | | 8/1995 | Bradbury |

(List continued on next page.)

OTHER PUBLICATIONS

"FoneCam" product literature, Innovationhouse.com online catalog Oct. 1998.*
"VueMate Hub" product literature, Black Box Corp. catalog, 1999.
Toshiba Corp. Press Release, Aug., 7, 1995.
"FoneCam" product review, PC Magazine Online, Oct., 30, 1998.
"FoneCam" product literature, Innovationhouse.com online catalog.
"Venue 2000" product literature, PictureTel Corp, Mar. 1998.
"AHA4600" product specification, Advanced Hardware Architectures, Inc. Jan. 1991.

*Primary Examiner*—Russell Adams
*Assistant Examiner*—Arthur A Smith

(57) ABSTRACT

A remote camera relay method and apparatus for remotely operating a self-contained, unattended digital camera over a communications link. Format conversion means are included for transparently relaying control signals and remote image data between a local host processor and the remotely located digital camera, independently of specific camera command and image protocols. It thereby functions as a universal remote image transmission adapter, operable as an attachment for use with self-contained digital cameras. A portable enclosure is provided for accommodating the remote relay communications and control electronics and for attaching a hand-held digital camera thereto. Further means are included for remotely actuating the pan and tilt orientation of the camera in accordance with field-of-view selection commands. Data rate conversion and error correction coding are included for providing reliable, low power image forwarding. The communications channel could be a dial-up telephone system, a network connection, modem, an infrared link or a wireless RF link, for example. Additional control means are provided for remotely selecting the camera field of view for image capture, and includes the ability to access only those subsets of image scenes for which viewing permissions are authorized. A further mode of operation includes protocol training whereby host photographing commands are captured by the remote relay invention during on-line operation, then replayed at programmed times resulting in automatic scheduled remote image capture. Power management is provided for maximizing operating time when used in low power, portable, battery operation.

20 Claims, 10 Drawing Sheets

U.S. PATENT DOCUMENTS

| | | |
|---|---|---|
| 5,467,157 A | 11/1995 | Kaneko |
| 5,682,557 A | 10/1997 | Harada et al. |
| 5,708,853 A | 1/1998 | Sanemitsu |
| 5,710,783 A * | 1/1998 | Luthi et al. ................. 714/755 |
| 5,806,005 A | 9/1998 | Hull et al. |
| 5,835,140 A | 11/1998 | Nakamura et al. |
| 5,838,250 A | 11/1998 | Maekawa |
| 5,910,959 A * | 6/1999 | Olafsson et al. ............ 714/752 |
| 6,166,729 A * | 12/2000 | Acosta et al. ............... 345/327 |

* cited by examiner

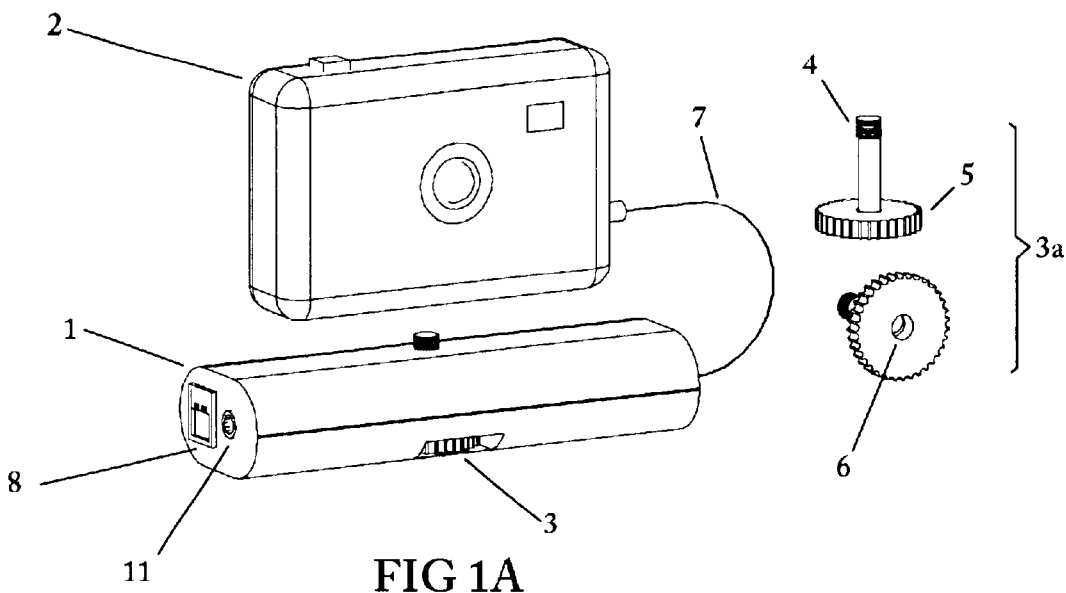
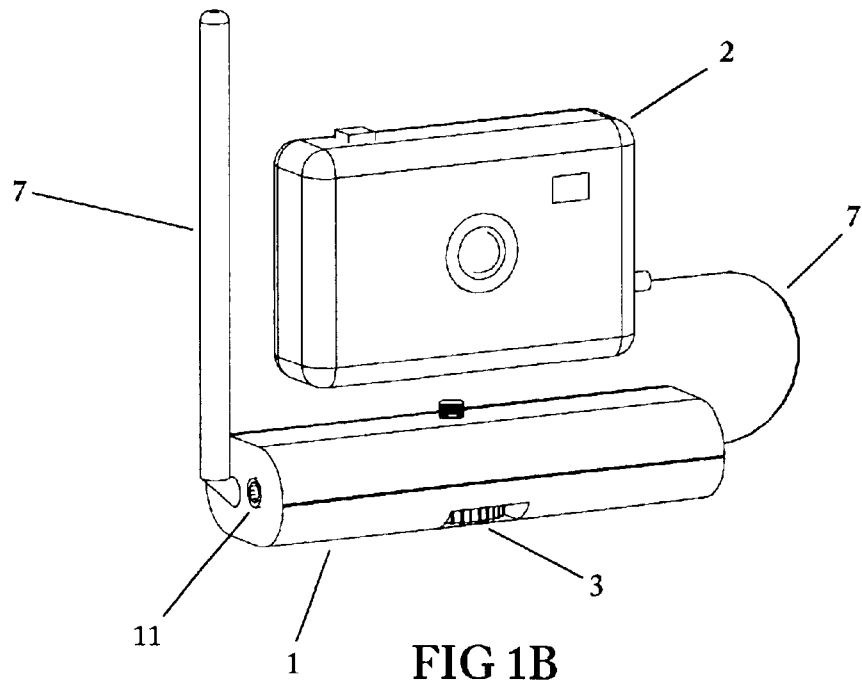

REMOTE CAMERA RELAY CONTROLLER METHOD AND APPARATUS

CROSS REFERENCE TO RELATED APPLICATIONS

This application claims the priority of U.S. provisional patent application No. 60/173,021 entitled "Remote Camera Relay Controller and Docking Apparatus", filed Dec. 23, 1999 by Paul Conoval.

BACKGROUND OF INVENTION

This invention relates to remote digital camera operation for controlling digital camera functions, transferring digital images and controlling camera orientation over a communications link. It combines the arts of digital camera technology and communications methods. In many applications there is a need to control camera functions and to view the resulting images from distant locations. Examples include the viewing of naturalistic and scientific observations, observing construction site progress, monitoring of unoccupied residences such as vacation property, surveillance and any other application where visual observation from a distant location is desired. It is also of significant value to remotely orient the camera in order to transmit various views with a single camera. For many of these applications the need for high-resolution images is more important than for real-time remote viewing. The present invention adapts the use of a self-contained digital camera and provides a remote control and imaging capability which can orient the camera to a desired field-of-view and forward high-resolution images.

Commercial digital camera products, which store images in memory as data rather than as optical images on film, have become widely available. In these devices, image data is captured into Random Access Memory (RAM), flash memory or floppy disk whereby the electronic image data becomes immediately accessible after a picture is taken. Although many digital camera products provide an LCD display for instant image monitoring, in general the data must be transferred from the camera to a computer, printer or other type of controller in order to view the images. As such, digital camera products typically include a communications interface in order for the data to be transferred or uploaded to a receiving device. An application program run on a computer typically controls several camera functions including the transfer of image data from the camera to the computer, image editing, image storage, control of the camera shutter function and also the deletion of images stored in the camera.

The use of analog modems for transmitting digital data over a phone line is also well known. Stand-alone, external modems commonly interface to terminal equipment by means of a serial interface known as an RS-232 or more recently Universal Serial Bus (USB), which defines a standard communications protocol including data formats, data rates and voltage levels which encapsulate the raw data. The modem converts the serial data into a signal compatible with the phone service being used, then. transmits the signal over the medium. In addition to conventional analog phone services other technologies are rapidly becoming available in an assortment of communications products including direct digital, wireless telephony and network connectivity. Each of these employs an appropriate terminal adapter for connectivity with its associated communications medium. For example, an ethernet card would be used instead of a modem if a network connection is employed.

Prior art devices include various combinations of computers, controllers, cameras, image transmission means and camera attachment means. Video telephony products such as VueMate provide video phones which transmit NTSC or PAL video camera images over a phone line. Other video-teleconferencing products such as PictureTel use aggregate phone lines or higher capacity leased lines for transmitting voice and images between user locations. Virtually all of the real-time video-teleconferencing products however, result in relatively low-resolution images due to phone line bandwidth limitations when used for real-time video. Some of the video-teleconferencing devices include integrated cameras, which automatically steer towards the person speaking. Others, including U.S. Pat. No. 5,467,157 describe a remote control tripod head for positioning large cameras. Several Prior Art patents including U.S. Pat. Nos. 5,708,853 5,442,512 and 5,111,498 show the integration of a camera, modem and controller for remote portable use. U.S. Pat. No. 5,806,005 describes a digital camera which transfers images over a cellular phone system for the purpose of increasing storage capacity by uploading images to a server, however it requires human interaction for providing manual command and control at the camera location. The image acquisition means of prior art devices are generally integral to the transmission means and don't allow for a modular attachment and remote positioning of the camera component. U.S. Pat. No. 5,682,557 however, describes a controller unit for a film camera which is attachable and detachable from the camera body, but lacks image transfer capability.

None of the prior art devices describe a combination that provides for the universal adaptation of a small, self-contained, digital camera that allows for transparent remote control and positioning for field-of-view selection with access control permissions. Further, none have the. ability to pass command, control and image data between a host viewer and remote camera over a transparent forwarding communications link, independent of specific camera communications protocols and data formats. Digital cameras connected directly to a computer for subsequent modem or LAN transmission have many disadvantages for field use. These include a relatively expensive installation, large size due to the aggregate combination of separate components, significant power utilization not suitable for continuous battery operation and incompatibility with outdoor use. Modularity of the present invention offers the unexpected benefits of supporting various remote imaging capabilities and requirements, with a simple substitution of alternative camera types. For example, a high-resolution digital camera may be needed for gathering scientific images, but the same relay controller can be used for remotely monitoring vacation property, requiring only an inexpensive low-resolution camera. Many types of digital cameras are commercially available from a multitude of manufacturers. Additional product offerings are rapidly increasing, as newer emerging imaging technologies allow for higher resolution, increased storage capacity as well as other features. As user requirements change, the camera can be swapped, without impact to the remote relay control capability of this invention.

SUMMARY OF INVENTION

It is one of the goals of this invention to provide a universal adapter to be used with various commercial digital camera products, giving the camera an ability to be operated remotely over a communications link as seamlessly as a direct camera-to-host connection.

An object of the disclosed invention is to provide for a small, portable and. robust integration of camera and communications components to effectively function as a single remote imaging and communications unit, but also to allow for the separate and independent operation of the digital camera when the relay controller is not attached.

Another object of this invention is to allow the use of the disclosed relay controller as an add-on attachment option to commercially available digital cameras thereby offering a remote, unattended imaging capability at low cost due to dual use as a conventional camera.

Another object is to reliably operate a remote digital camera over a communications link and to robustly forward image data in the presence of communications link disturbances including bit errors, data dropouts, time delay and link protocol artifacts such as data loss during link negotiations.

It is also an object of this invention to provide a remote camera control attachment which has the ability to remotely pan and tilt the camera in accordance with a commanded field-of-view selection.

It is also an object to provide the ability to enable remote viewing of only portions of image scenes in accordance with permissions granted to authorized users.

Another object is to provide a general purpose remote image relay method which transparently interconnects a commercial digital camera to a local host viewer independent of specific camera communications protocols.

Another object is to apply low power communications methods and error correction coding for transmitting remote camera images to a receiver.

Another object of this invention is to provide a weather-resistant enclosure comprising wireless communications means in which a self-contained digital camera can be inserted and protected from the elements.

A further object is to provide a low cost, high-resolution, modular, remote image relay means by using the image acquisition and storage capabilities of a commercial digital camera.

Still further, this disclosure presents a method and apparatus for passing image data from a remote digital camera to a local controller without the need of a collocated computer or controller at the remote location.

Yet another object of the disclosed apparatus is to allow for the relay controller to accept schedules and camera control scripts for autonomous operation.

Another object is to provide a method for on-line protocol training and capture of camera command and control transactions for later off-line replay.

It is also an object of the disclosed apparatus to provide efficient power management using rate conversion and signal processing methods so that the digital camera can operate for extended time periods in a portable, battery operated configuration.

The above objects and other objects inherent in the present invention will become more apparent when read in conjunction with the following specifications and drawings.

BRIEF DESCRIPTION OF DRAWINGS

FIG. 1A shows a modem configuration of the remote relay controller in relation to an external digital camera attachment.

FIG. 1B shows a wireless communications configuration of the remote relay controller in relation to a digital camera attachment.

DETAILED DESCRIPTION

PRINCIPLE OF OPERATION

Figure 2A:
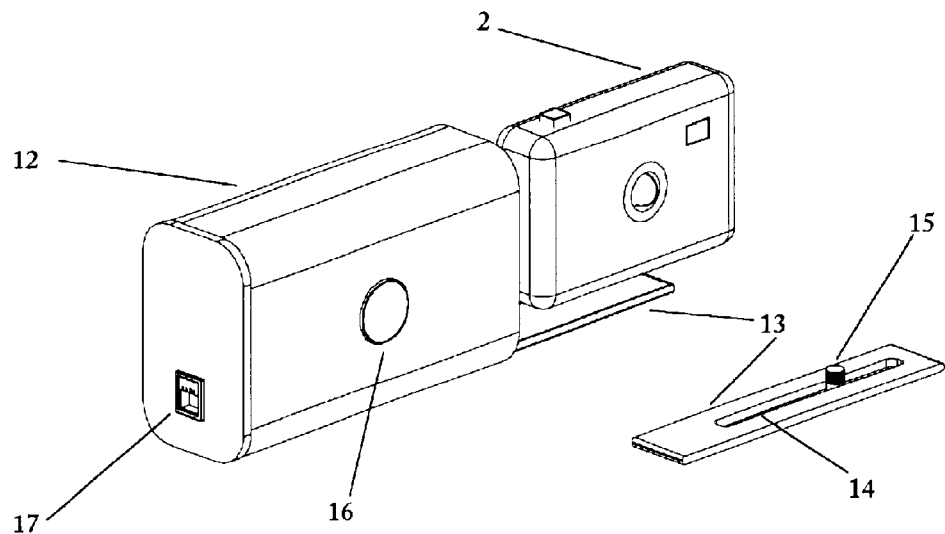
FIG. 2A shows a modem configuration of the remote relay controller which encloses a digital camera.

The present invention comprises a method and apparatus for universally adapting remote operation to many types and brands of digital cameras. The apparatus allows for a connection between camera and computer, but instead of a conventional serial port interface between the computer and digital camera as typically used in a collocated environment, the relay apparatus remotely forwards data through a communications link. Knowledge of specific command protocols and image formats for individual camera products becomes unnecessary herein by transparently relaying command data from a host system to the remote digital camera, and for relaying image data from the remote camera to the host system. It functions as a data repeater which regenerates signals across the link, rather than depending on a field controller for directing the camera functions. A digital camera is not typically intended for operation over a communications link in this manner and therefore special consideration is given to the communications problems associated therewith. Link characteristics such as electrical noise, transmission delay and data errors, unique to the adaptation of digital camera data flow over a communications link, are addressed. The invention eliminates the requirement for a computer or controller in the field, lowers cost, complexity, size and power of remote hardware and allows for the adaptation of arbitrary command and image protocols formats independent of any particular camera product.

It is one of the goals of this invention to provide a universal adapter to be used with various commercial digital camera products, giving the camera an ability to be operated remotely over a communications link as seamlessly as a direct camera-to-host connection. Additional control elements are included which allow for the field of view to be remotely selected by controlling pan and tilt actuation of the attached camera. Remote zoom control may also be accomplished by using a camera having this feature.

In a collocated camera-computer configuration, bit errors, data dropouts and clock timing problems generally don't occur since the computer and camera are directly coupled. The addition of a communications forwarding link between the remote camera and the local host processor however, introduces several problems. For example, a modem telephone link typically introduces time delays when a data packet received in error needs to be retransmitted. Also, modems such as the V.34 and V.90 standards, automatically modify communication baud rates in response to channel quality, thereby introducing long dropouts during the re-negotiation and retraining phases of modem setup. There also exists an inherent clock timing inaccuracy between asynchronous terminal devices and modem communications equipment. Since these characteristics typically occur on a modem link, corruption of image uploads can be expected. Furthermore, in most digital camera products where image compression is employed, decompression is extremely sensitive to received errors and can result in totally garbled images. Although some direct camera-to-host application software provide a limited error handling ability, the introduction of typical transmission link characteristics would overwhelm it.

In order to provide reliable, seamless communications between a remote camera and a local host processor, the relay controller invention includes data format conversion means. It accepts format and timing characteristics compatible with digital camera operation, and converts it to modified signals that are compatible with the communications link transmission characteristics. It provides data rate conversion by accepting input data streams at a constant continuous rate from the camera, but outputs data at a second rate which contains processing to absorb the bit error and timing variations of the communications link described previously. The output may be non-continuous, it can accept requests for retransmission of data packets received in error or include error correction encoding to allow for continuous transfer of reliable communications without retransmission. As a result, data can be transparently streamed between the camera and the relay controller apparatus without special consideration of the transmission link characteristics, thereby allowing the camera to output large image data streams in a single uninterrupted, continuous transfer in the same manner as if using a direct camera-to-computer interface.

The data rate conversion means disclosed herein takes advantage of the inherent asymmetrical characteristic of information flow unique to the digital camera environment. In contrast to a typical bidirectional communications channel wherein the data rates and information size are more or less equal, a digital camera involves small amounts of command and control data traffic in one direction but large, image data streams in the other. The command and control signals into the camera, such as shutter-release, delete-photo or get-image only take a few bytes but transferring the image data to the host computer however, takes from tens to hundreds of thousands of bytes depending on image resolution and image compression algorithms employed.

Vendor proprietary protocols are often used when exchanging commands, acknowledgments and data between the camera and the computer application software. The specific formats of the command strings and image data vary from product to product, however the fundamental camera operations are generally similar. These include shutter control, uploading of images and deletion of images stored in the camera. Power on/off control and record/play control are also accessible from the serial interface in many commercial digital cameras. An example of a camera that is completely controllable through a serial interface, is the Largan, Inc. Model 350 digital camera, which is used as part of the preferred embodiment disclosure. In order to allow for remote control in other digital cameras requiring manual switching, direct access to the switch contact points by the relay controller may be used or alternatively, electromechanical means controllable by the relay electronics may be included to actuate these switching functions.

One of the functions of the disclosed invention is to reproduce the camera command sequence that would normally appear at the communications interface as if a direct connection to the controlling computer were present. Data interface is accomplished by means of a physical connector between the serial port of the digital camera and the relay controller electronics. Some recent digital cameras however, employ an infra-red (IR) link for communicating between the camera and the controlling computer. Without loss of generality, an IR link, RF link or any other wireless communications method can be applied to the relay controller as well.

The disclosed invention provides several communications modes. The first transparently passes a reproduction of the serial signal data that would be present at the camera/computer interface. For example, a command byte string sent from the computer serial interface, passing through the transmit modem will reappear intact at the camera interface after passing through the receive modem and receive USART. The image data streaming from the camera will pass continuously into format conversion means where it is rate converted, then through the send USART and send modem, back to the host.

A second mode directs all communications from the local host computer to the remote relay controller electronics, not the camera. In this mode dedicated commands are recognizable and acted on by the relay controller. This mode is used for accepting schedules of photo events, controlling camera positioning means, controlling electromechanical actuators and other ancillary functions related to the control capture of images. Feedback data can be returned from the remote relay controller to the local host processor containing information such as photo capture times, status of positioning means and other information as needed.

A third mode provides for protocol training by capturing the command strings at the remote relay controller, during on-line operation of the remote camera. The captured command strings are associated with the intended function then recorded in the relay controller memory. The captured command strings can later be replayed, off-line, so that a scheduled autonomous camera control may be achieved without having an active on-line communications link to the host processor. For example, without having specific knowledge of the camera "take-photo" protocol and command format, the application software at the local host computer can issue the command to the camera. While it is being received at the camera, the relay controller intercepts the signals and stores it memory. Subsequently, and independently of host generated commands, the remote relay electronics can replay the captured command strings into the camera directly, thereby activating the "take-photo" command at a future time. This in combination with the second communications mode described above, allows for events to be scheduled and camera commands activated off-line. As example of an application, the user may want to schedule a photo to be taken every hour, only on the first day of the month. In addition, the relay apparatus has the ability to autonomously initiate and establish communications and to relay camera image data back to the host.

In an alternative wireless embodiment, the remote camera relay uses an RF link as the communications medium to transfer image data between the remote digital camera and a local host computer. In this configuration a portable, battery operated operation is realized, therefore several factors including battery energy consumption, maximizing reception distance and minimizing radiated power are considered. In most remote viewing applications, there is expected to be a relatively long idle time between snapshots. The null time periods between photos. can be taken advantage of by applying signal processing methods to reduce transmitter power, extend reception range, improve reliability and extend battery life. In RF communications systems, it is well known that reliable data reception is dependent on the ratio between receiver energy-per-bit and electrical noise (Eb/No). Increasing transmitter bit duration results in an increased Eb/No which can be realized by stepping down the transmitter image data rate.

Data format conversion means accomplishes a stepped down rate conversion in the RF link by accepting the camera image data at its nominal camera baud rate, buffering the image data, then passing the buffered image data at a much lower rate to an RF transmitter. Alternatively, since digital cameras inherently store the captured images in intern al memory, the camera could be commanded to output data at its lowest communications port rate, thereby eliminating the need for additional buffer electronics in the remote relay controller. However, to achieve extremely low rates and low power, an external buffer is still required. It is well known to those skilled in the art of communications theory that transmitted power is the rate at which the bit energy in sent. In other words, it takes more power to transmit the same bit energy in a short time period as opposed to a long time period. If the image data captured in the digital camera is forwarded over a long. time duration, then significant power can be saved.

The expansion of the information bit transmission time of this invention allows for other communications techniques to be applied thereby offering even further advantages and benefits in addition to low power. For example, spread spectrum techniques such as direct sequence modulation could use the time-expanded bits for improved interference rejection. Error Correction Coding could be applied for decreasing the bit error rate or alternatively providing gain thus further lowering transmitter power. Spread spectrum and Error Correction Coding are widely used in RF communications systems and are well known to those skilled in the art of digital communications. In the preferred embodiment example that follows, Forward Error Correction (FEC) coding is used in combination with time expansion of data for the purposes of reducing transmitted power, expanding relay controller battery life and increasing the reliability of the communications by decreasing bit-error rate.

When applying error correction coding, redundant bits are appended to the original information bits in accordance with a given encoding algorithm. In doing so, received bit errors can be detected and corrected by a compatible decoding algorithm before passing the data on for subsequent processing. The ability to correct bit errors at the receiver allows for some degradation to occur in the RF link without suffering a performance penalty. A reduction in transmitter power or a reduction in Eb/No can be compensated for by taking advantage of coding gain.

The operation of the enclosure adds to the overall functionality of the invention. The enclosure has a form-factor which houses the modem, USART, and processing electronics, but also comprises means for attachment of the camera using a standard threaded camera screw mount typically found on photographic equipment. In one configuration the enclosure includes a stage comprising electromechanical actuators which pans and tilts the attached camera in accordance with received commands. The camera attached to the stage can then be rotated independently in multiple planes, depending on the number of actuators used. For the ability to pan across a 360 degree field-of-view, a single motor, arranged to rotate in the lateral plane, is used. For camera tilt capability, a second motor allowing movement in the vertical plane is added. Other rotations may be accomplished by using additional motors however, in most practical applications only lateral and/or vertical angular positioning is required. The conversion of the received positioning commands to electrical signals compatible with the actuator movement is achieved by the relay processing electronics.

A serial communications connector, a modem connector and a power connector are included as ports on the enclosure body. When mounted to a camera, the relay controller invention results in an integrated unit having all cables and connectors neatly arranged. Package size is minimized by use of a modular modem, such as the Cermetek model #1798, and integrated ASIC electronics for providing all electronics processing in a small package, compatible with the size, shape and footprint of the attached camera.

In one application, passwords are stored in the relay controller electronics wherein, each password has a specific field-of-view associated therewith. When attempting to remotely view images, the user must provide a password that is sent to the remote relay controller. The camera then becomes oriented by means of the pan and tilt actuators in accordance with password permissions thereby allowing only those sections of the image scene to become accessible to the user. This mode can be used as a service for remote viewing of personal property within a larger scene, such as monitoring a car in an airport parking lot or an individual boat in a marina without invading the privacy of neighboring property owners.

DESCRIPTION OF PREFERRED EMBODIMENT

Referring to FIG. 1A, an overall view of the remote relay controller in relation to an external digital camera is shown. In this configuration, communications between the remote relay controller and a local processor is accomplished by means of a modem. Digital camera 2 attaches to enclosure 1, which contains the relay controller electronics and modem, by means of mounting screw assembly 3. A detail of mounting screw assembly 3 is shown as 3a which includes a threaded mounting screw 4 on one end and a knurled knob 5 on the opposite end. Knurled knob 5 has embedded therein, a threaded cavity 6 for receiving a reciprocal threaded screw for attachment of an additional mounting device such as a tripod, bracket or the like.

Mounting screw 4 has a standard thread dimension such as that typically used to attach photographic equipment to a tripod stand. Mounting screw assembly 3 passes through enclosure 1 as shown. Attachment of camera 2 to enclosure 1 is accomplished by tightening screw 4 with knurled knob 5 into a cavity within the body of camera 2 which has reciprocal threads for accepting screw 4. Shown in FIG. 1A is a connector cable 7, for electrically interfacing the control port of digital camera 2 to the relay electronics contained within enclosure 1. In the modem configuration of FIG. 1A, an RJ11 telecommunications receptacle 8, which is typically used for connection of telephone equipment to dial-up phone lines, is used to interface the relay controller modem to communications signals. This is used for interconnecting the relay modem signals to a distant controller over a telephone network.

FIG. 1B shows a relay configuration which includes an RF link as an alternative to a modem for establishing communications between the remote relay controller and a local processor. Digital camera 2 attaches to enclosure 1 in an identical manner as that described in FIG. 1A. In the RF link configuration of FIG. 1B, the camera control and image data signals are modulated onto an RF carrier and passed through antenna 7. In both configurations of FIG. 1A and FIG. 1B a power connector 11 is shown for supplying external power to the remote relay controller electronics. Internal batteries can alternatively be included within enclosure 1 for operating the electronics.

Figure 2B:
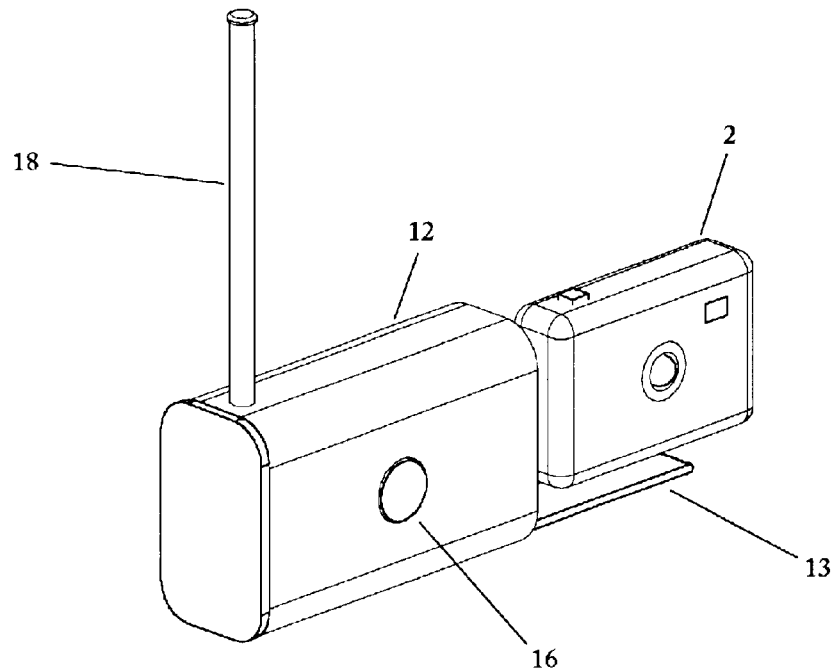
FIG. 2B shows a wireless communications configuration of the remote relay controller which encloses a digital camera.

FIGS. 2A and 2B illustrate an alternative embodiment of the relay controller apparatus. In this configuration, digital camera 2 becomes completely contained within enclosure 12. FIGS. 2A and 2B correspond to a modem embodiment and RF embodiment, respectively. In FIG. 2A, communications signals between the remote relay controller electronics and the local processor are interfaced by means of RJ11 telephone receptacle 17. In FIG. 2B, RF signals are passed through antenna 18. Camera 2 attaches to slide rail 13 having a slot 14, with a threaded mounting screw 15. Slot 14, allows camera mounting screw 15 to be positioned at any point along slide rail 13. This makes it possible to accommodate various camera dimensions and mounting thread locations in order to properly position the camera so that its lens aligns with window 16 as slide rail 13 transports camera 2 laterally into the body of enclosure 12. This allows photographs to be taken while in the inserted position. Slide rail 13 is retained within enclosure 12 by using common attachment means including friction, mechanical fasteners or the like.

Figure 3A:
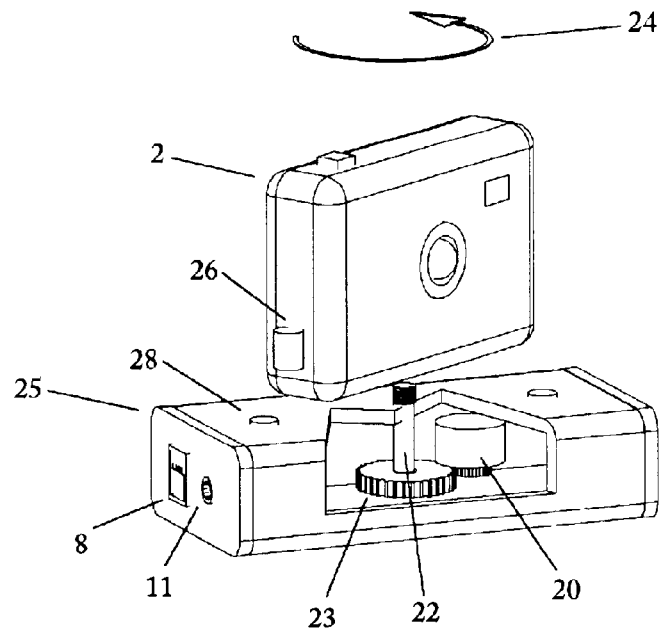
FIG. 3A shows the remote relay controller including a panning motor for laterally rotating the attached camera.
Figure 3B:
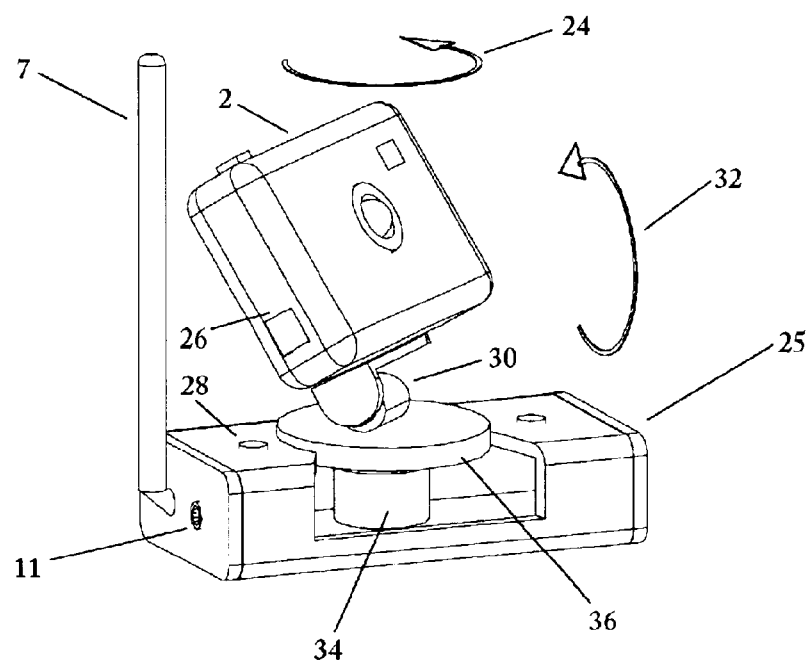
FIG. 3B shows the remote relay controller having a camera positioning stage including a tilt motor and a panning motor for vertically and laterally rotating the attached camera.

FIGS. 3A and 3B show an embodiment of the remote relay controller apparatus including means for rotating the camera for taking photos and forwarding images from various viewpoints. Motor 20 of FIG. 3A, included in enclosure 25 is coupled to mounting screw assembly 22 by engaging the knurled sprockets 23 as shown. Motor 20 is rotatable in the lateral plane 24 which results in the panning of an attached camera when an appropriate motor control signal is applied. FIG. 3B shows additional means for achieving a camera tilt and a camera pan capability with the application of stepper motor 30, rotatable in the vertical plane 32 and stepper motor 34, rotatable in the lateral plane 24 respectively. Many types of motors can be applied for camera positioning however in the preferred embodiment a commonly available, 6-lead unipolar stepper motor is used in combination with a commercially available UCN5804B stepper motor driver circuit for position control. The relative, orthogonal orientation of the lateral stepper motor 34 and vertical stepper motor 30, arranged on a stage 36 results in achieving 360 degrees of pan and tilt movement. Communications between digital camera 2 and the relay controller electronics contained within enclosure 25 can be accomplished by means of a physical electrical connection having enough slack to allow free movement therebetween. Alternatively, as shown in FIGS. 3A and 3B, digital camera 2 has an infrared port 26 which communicates with a compatible infrared port 28 included as part of the relay controller, without impeding camera rotation.

Figure 4A:
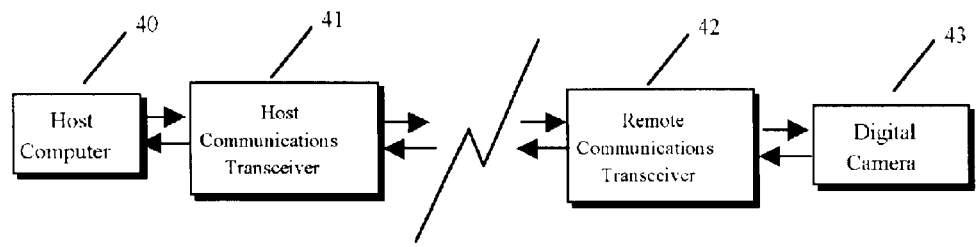
FIG. 4A is a high-level block diagram of an embodiment of the remote camera relay and its relationship to communications with a host computer.

Referring to FIG. 4A, a high-level block diagram of the remote relay controller and its relationship to a host computer communications is shown. In this configuration a remote digital camera 43 receives commands originating from a local host computer 40through host communications transceiver 41 and remote communications transceiver 42. Camera 43, in turn, returns image data as well as command acknowledgments and other status information back to host computer 40 through transceivers 42 and 41. Host communications transceiver 41 receives data from host computer 40 then modulates the signal onto a suitable carrier for transmitting the data across the transmission medium where it is received by remote communications transceiver 42 before being passed on to digital camera 43. Transceivers 41 and 42 could be a pair of dial-up modems, wireless modems, RF link, infrared link or any other means for transporting data signals between dislocated end points. Similarly, in the opposite direction, transceiver 42 receives data from digital camera 43 then modulates and transmits the data to transceiver 41 which demodulates the signal and passes the data to host computer 40. An example of a camera command and image transfer will now be described.

A camera command to "take a photo" is initiated by application software running on local host computer 40. The command has been formatted by the camera vendor software in accordance with the protocols required by the specific digital camera being used. It is not necessary for the remote relay controller to know the specific command formats and camera vendor protocols used, since the invention will transparently pass signals across the link thereby reconstructing the correct format at the camera port. Command packets for controlling camera functions are generally very short in comparison to the very large data records returned from the camera. Although transparent communications allows for the use of vendor products without modification, the use of custom software for digital camera control is not precluded if camera data protocols are known.

The remote relay controller herein provides format conversion means for converting the timing and data flow formats of the digital camera, into timing and data flow characteristics of the communications link, and vice verse. Format conversion means comprises the steps of rate conversion, error correction processing and data re-formatting. For example, when commanded to transfer an image, the Largan digital camera responds by outputting a continuous stream of JPEG compressed data bytes until the entire image record is exhausted. The data exchange between the local and host modems however, are formatted into data blocks, in which data flow is not strictly continuous. Data flow becomes interrupted during modem-to-modem signal negotiations as well as retransmission of data packets caused by received bit errors. The Clear-To-Send (CTS) and Request-To-Send (RTS) signals are common control signals provided by the modem equipment, normally used to suspend data flow when the communications link is busy or unavailable. Since the image data flowing from the Largan digital camera is a continuous stream, suspension of data flow is not possible. The rate conversion means however, accepts the continuous image data at the camera baud rate, temporarily buffers the incoming data in order to absorb input and output rate differences, then outputs the data to the modem interface in accordance with the CTS link availability signal.

Figure 4B:
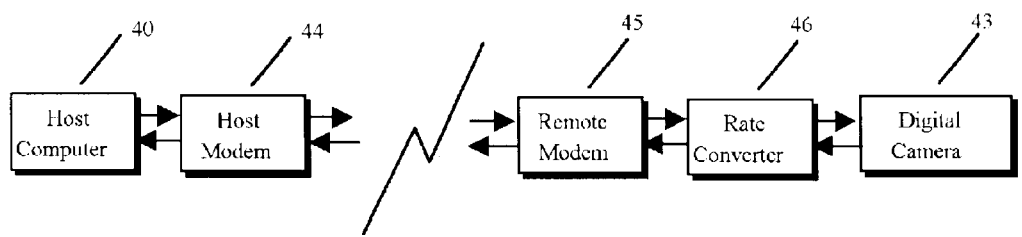
FIG. 4B shows a high-level block diagram of the remote relay controller using data rate converter and modem.

Referring to FIG. 4B, a short byte sequence which is recognizable by the digital camera is passed out of host computer 40 through a standard serial port where it would normally expect the digital camera to be located. Instead, host modem 44 receives the serial data from host computer 40. Remote modem 45, which has established communications with host modem 44, passes the camera command data to rate converter 46. The output of 46 is then supplied to the serial communications port of digital camera 43. Since the command sequence received at the camera communications is identical to that which would have been received if camera 43 had been directly interfaced to host 40, camera 43 acts on the command and takes a photograph. Depending on the particular digital camera used, camera 43 will then either automatically pass the image data out of its communications port, or else it can be commanded to do so in a similar manner as that just described for taking the photo. In either case, a digital representation of the photo is passed from camera 43, into rate converter 46 which modifies its data rate and format for compatibility with error-free link transmission transaction. The Largan digital camera continuously passes the entire image frame in a standard JPEG compressed format until completed. A typical color digital image having a resolution of 480 by 320 pixels contains from about 30,000 to 100,000 bytes depending on the image compression format. The output of 46 is then passed to modem 45 for transmission of the image data to host modem 44 which then supplies host computer 40 with the received data bytes, recognizable by the host image viewing software.

In the preferred embodiment, the Largan digital camera operates at its default serial port rate of 19,200 baud. The image data stream from camera 43 is passed on to rate converter 46 which steps up the input serial rate from 19,200 to an output rate greater than 21,600 baud, which is the DCE rate between host modem 44 and remote modem 45. Remote modem 45 is the commercial Cermetek model #1798 modem that can be configured to accept DTE data at one of several standard baud rates then transmit the data using a different DCE rate. The serial communications port of host computer 40 is configured to send and receive data at a 38,400 rate. The net effect is an asymmetrical data transfer that transmits camera 43 data at 19,200 baud and is ultimately received by host computer 40 at 38,400 baud. In the reverse direction, commands originate at host 40 at 38,400 baud, which are ultimately received by digital camera 43 at 19,200 baud.

The Cermetek model #1798 modem supports a range of modem standards and speeds. It has been selected because of its small size and high functionality. Communications modes can be programmed using the standard AT command set, well known to those skilled in the art of modem applications. The present invention uses several of the modem capabilities including automatic answer and link connectivity. Modem 45 is configured with the following AT command settings that are stored internally to the Cermetek modem in non-volatile memory:

ACTIVE PROFILE: B1 E1 L1 M1 N1 Q0 T V1 W1 X4 Y0 &C0 &D0 &G0 &J0 &K0 &Q5 &R1 &S0 &T5 &X0&Y0S00:001 S01:000 S02:043 S03:013 S04:010 S05:008 S06:002 S07:050 S08:002 S09:006S10:014 S11:095 S12:050 S18:000 S25:005 S26:001 S36:007 S37:000 S38:020 S44:020S46:136 S48:007 S95:000

This configuration allows for modem operation without connection to data terminal equipment (DTE) such as a computer. In addition these settings enable modem 45 to automatically answer upon receiving a ring signal. The minimum modem modulation connection rate is set to 21,600 by using the following setting in which V.34 modulation is selected:

AT+MS=11,1,21600,33600

The exchange of modem signals for negotiations and establishment of a data connectivity are standard modem operations which are well known to those skilled in the art of modem communications.

Figure 4C:
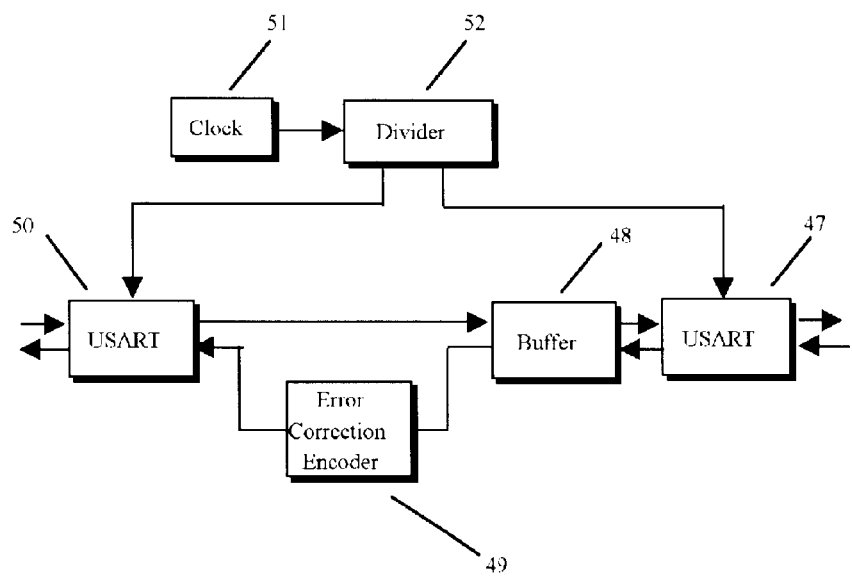
FIG. 4C shows a detailed block diagram of the data rate converter performing Error Correction Coding.

FIG. 4C shows a more detailed functional block diagram of rate converter 46. Herein, image data from digital camera 43 of FIG. 4B is received by USART 47 which converts the 19,200 baud, serial format of the image data into byte-serial words. The output of USART 47 feeds buffer 48 which accumulates a block of data bytes before forwarding it to error correction encoder 49.

Although many different types of error correction codes are available, in this preferred embodiment a Reed-Solomon code is used due to its high error correction performance, low overhead and relatively simple encoding which is important for minimizing power when applied to wireless applications. Decoding is much more complex however, but decoding is done at the receiver side of the transmission where low power and hardware sizing are not concerns. In the preferred embodiment, error correction encoder 49 is a Reed Solomon (255,223) code which can correct 16 bytes in error out of a block of 255 bytes. This code requires 32 parity bytes to be appended to each 223 bytes of information. However, more than 5 dB of coding gain is achieved which is equivalent to three-fold extension of transmitter battery life. Error correction coding can be used to improve bit error rate performance and to significantly reduce transmitter energy consumption. The output of encoder 49 is passed to USART 50 at a rate higher than the camera image rate, due to the appended coding overhead. Clock 51 feeds divider circuit 52 which supplies USART 47 with a 19,200 baud rate and USART 50 with a rate greater than 21,600 baud.

Command packets in the opposite direction are received by USART 50 at the negotiated modem DCE rate exceeding 21,600 baud,. then pass directly to buffer 48. Since command packets are short in duration, coding is not required for either power-savings or error rate improvement, and is therefore not used. The output of buffer 48 is sent to USART 47 which is stepped down to 19,200 baud before passing on to the digital camera port.

In a low-power wireless RF configuration, the relay controller receives image data from the digital camera at a nominal 19,200 baud rate and temporarily stores the block of data. in a buffer. The image data rate is then stepped down to 2,400 baud and passed on to an RF transmitter for sending the image data to an RF receiver. At the lower rate, it takes eight times as long to transmit the buffered image data however, this requires only one-eighth the radiated power for transmitting the same bit energy as the 19,200 baud rate. As an alternative to reducing radiated power, the signal can be transmitted at full power at 2400 baud resulting in a 9 db energy gain which corresponds to several orders of magnitude improvement in bit error rate performance.

Figure 5:
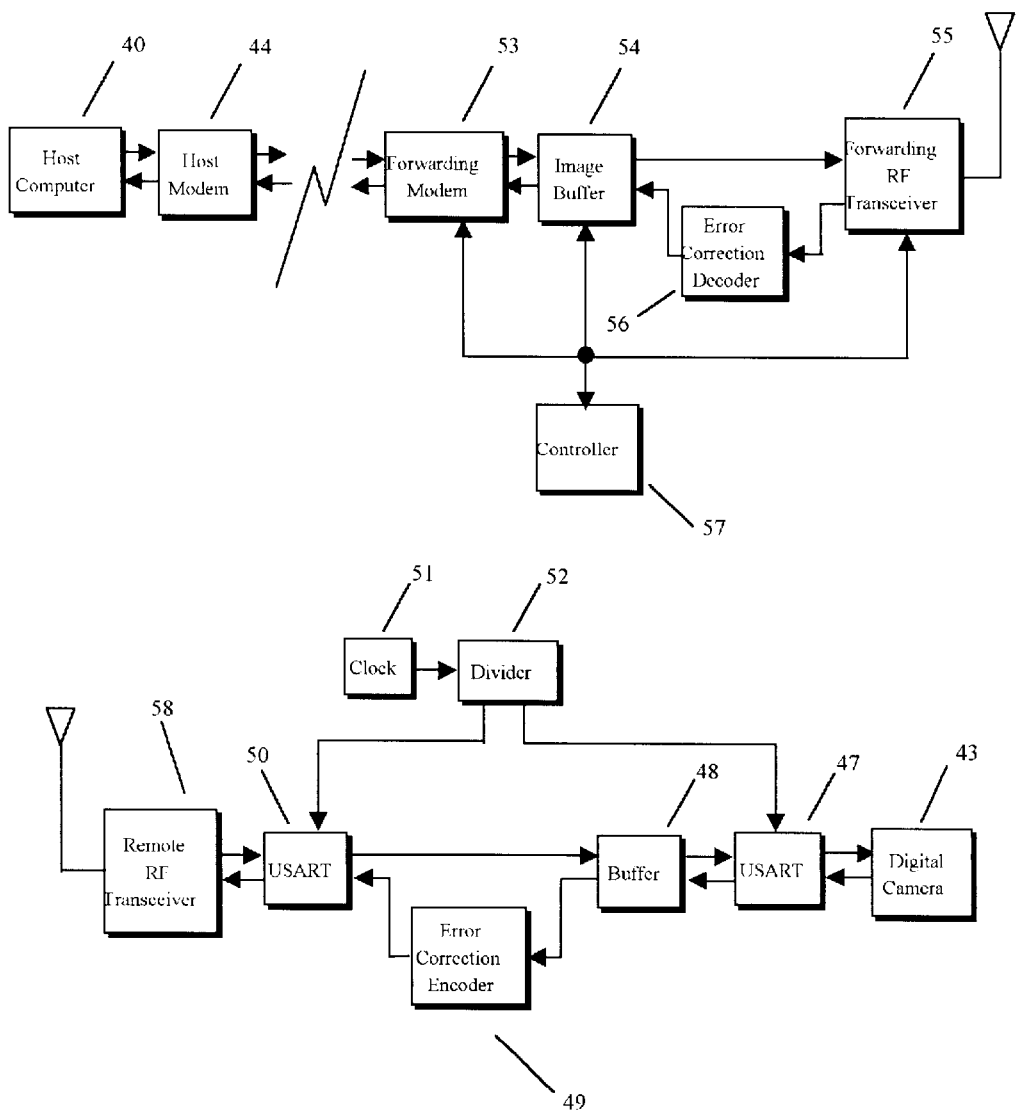
FIG. 5 is a block diagram of the remote relay controller in a wireless forwarding system configuration.

FIG. 5 shows a more detailed functional block diagram of the remote camera relay controller as used in a wireless configuration. Herein, an RF link is used to relay camera commands and image data between the remote digital camera and a forwarding dial-up modem, which in turn communicates with the host computer. In this case, the rate conversion function accepts data at a first rate then steps down the image transfer rate in order to reduce transmitted power and also improve bit error performance.

Image data from digital camera 43 is received by USART 47 which converts the 19,200 baud, serial format of the image data into byte-serial words. The output of USART 47 feeds buffer 48 which accumulates an entire image block potentially containing tens of thousands of bytes. The data block from buffer 48 is then input to Error Correction Encoder 49 which segments the data into sub-blocks and adds redundant bytes to each sub-block in accordance with the error correction algorithm being employed. The sub-block size depends on the specific coding format being used. However in this embodiment, a Reed-Solomon (255,223) code, which is well known to those skilled in the art of error correction coding, is applied. The encoded data block from 49 is passed on to USART So which converts the byte serial words back into a bit serial data stream at a stepped down rate of 2,400 baud. Clock 51 in this case feeds divider circuit 52 which supplies USART 47 with a 19,200 baud rate and USART 50 with a 2,400 baud rate. The output of USART 50 is then passed to remote RF transceiver 58 which modulates the encoded and stepped down image data for transmission to forwarding RF transceiver 55.

Transceiver 55 demodulates the received image data and passes it to error correction decoder 56 which performs the Reed-Solomon (255,223) error detection and correction algorithm. Decoder 56 corrects any errors that may have occurred in the RF link, strips off the parity bytes then passes the decoded image data to image buffer 54. The data in image buffer 54 then passes on to forwarding modem 53 at 19,200 baud rate. The rate conversion in this case is accomplished by controller 57 which is a PIC 16876 series microcontroller, which governs the data flow from buffer 54 into forwarding modem 53. Controller 57 also has an input to RF transceiver 55 for applying spreading and de-spreading pseudo-noise sequences if spread spectrum communications processing is employed. The data output from forwarding modem 53 is transmitted over a dial-up phone network to host modem 44, then passed on to host computer 40 for viewing images.

Command data originating at host computer 40 passes in reverse through the identical processing chain, with the exception of the error decoding and error encoding functions. Command data from image buffer 54 passes directly to forwarding RF transceiver 55 and the remotely received command data is passed from USART 50 to buffer 48. As before, coding is not used in the command direction because of the short duration of command packets.

Figure 6A:
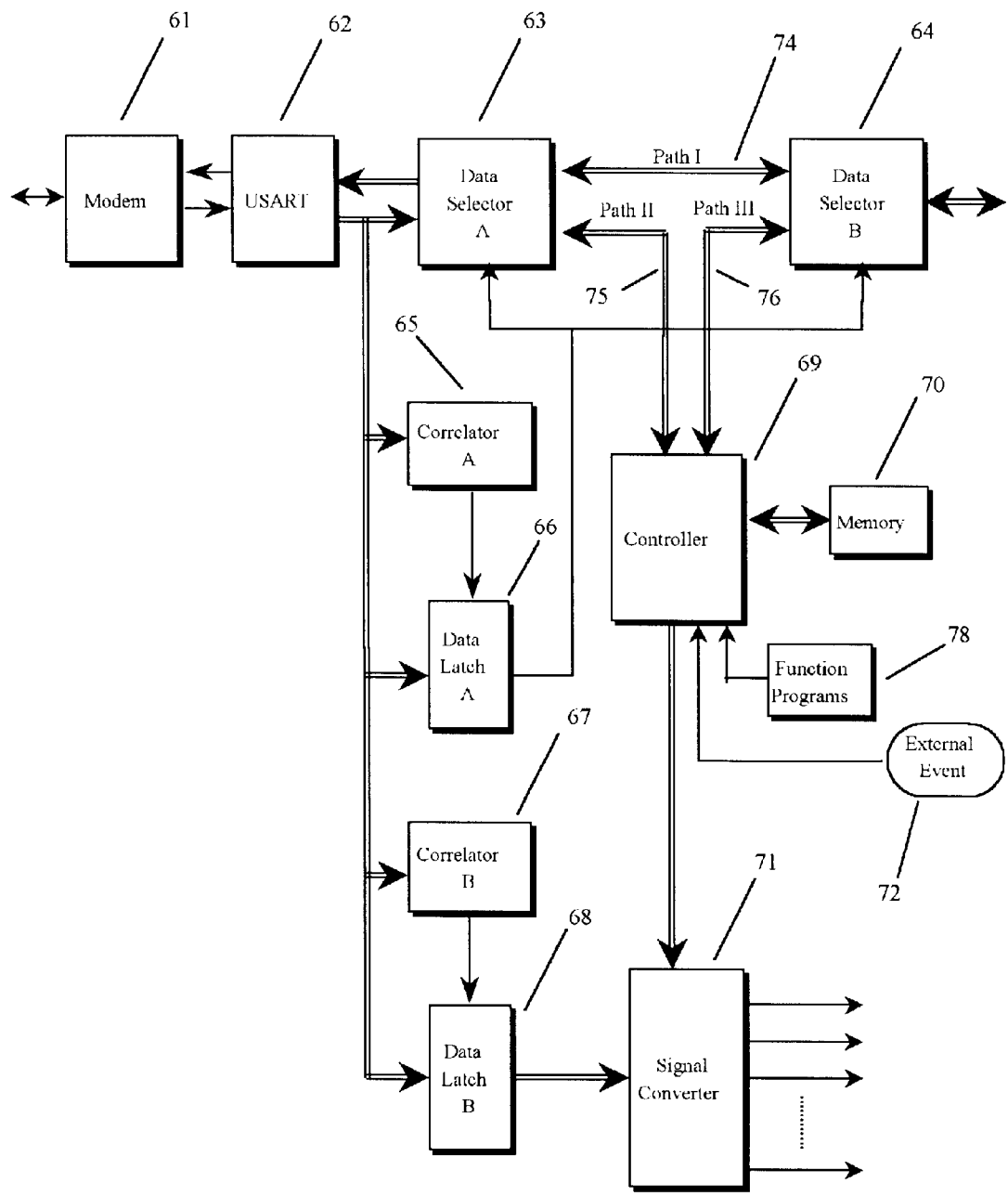
FIGS. 6A to 6E show detailed block diagrams of various operational modes of the digital relay controller electronics.

FIG. 6A is an implementation block diagram of the Remote Communications Transceiver 42 shown in FIG. 4A, including relay controller electronics for performing the functions described in association with FIGS. 3A–3C and FIG. 5. In this embodiment, Host Communications transceiver 41 and Remote Communications Transceiver 42 achieve communications by using a pair of modems. The signal interface between Remote Communications Transceiver 42 and the Digital Camera 43 is understood to be the external interface of Data. Selector-B 64 with respect to the following description.

With reference to FIG. 6A, a modem communications signal that contains data generated by a local host processor, is received at the input of modem 61 . The communications signal at the input of modem 61 contains data having a command protocol consistent with operation of the digital camera. The commands initiated by local processor are identical to those that would pass directly from an application software program to the camera communications port in a conventional collocated computer-camera configuration. After establishing modem communications, the modem outputs a standard RS232 signal which is then passed to USART 62 where the RS232 start bit, stop bits and parity bits are removed, resulting in a byte serial format of the received data. The RS 232 signal is a well known communications protocol used frequently for data communications. The output of USART 62 is then passed to correlator-A 65, data latch-A 66, correlator-B 67, data latch-B 68 and also to data selector-A 63 which functions as a crossbar switch in combination with data selector-B 64. These will each be described.

Commands initiated by the host computer comprise two types of data communications. The first are the packets sent by the camera application program and are intended to be received and operated on by the digital camera. The second are command and data packets intended for receipt by controller 69 which are used for functions external to the digital camera including camera positioning commands, time schedules and password downloads. The second controller command blocks are generated by a program running on the host computer and are structured to have unique header bytes to indicate controller operation. The unique header bytes are recognized by correlator-A 65 which then enables data latch-A 66 to hold subsequent path selection command bytes received from USART 62. The output of data latch-A 66 then serves as the control signal for data selector-A 63 and data selector-B 64 which govern the selection of signal source and destination between USART 62, controller 69 and the interface signal from Data Selector-B 64 to the digital camera.

The bytes that follow are then routed to either the camera or to controller 69, depending on the path selected. For camera data, signal path I 74 is selected which interconnects USART 62 data flow to the camera serial port. For control data, path II 75 is selected thereby establishing a connection between USART 62 and controller 69. A third signal path can be established which interconnects controller 69 and the digital camera by selection of Path III 76 which allows for the control of the camera directly by controller 69 rather than through the application program at the local computer via the communications link. This supports autonomous operation of the camera by replaying camera command scripts stored in the relay processor. An additional signal path which passes data between USART 63 and controller 69 simultaneously to a connection between controller 69 and the camera interface can be made by simultaneously selecting Path II 75 and Path III 76. This path can be used to provide data processing between the digital camera and the forwarded data stream including data.format conversion, rate conversion, Reed-Solomon error correction coding and image data buffering that was discussed in reference to FIGS. 3A–3C and FIG. 5.

Also shown in FIG. 6A are connections between USART 62 to correlator-B 67 and data latch-B 68. These function in a similar manner as those described for correlator-A 65 and data latch-A 66, except in this case unique commands are recognized for controlling external functions including camera positioning, electromechanical switch actuation, zoom lens motor control, infrared illuminators, etc. The external control command is passed from data latch-B 68 to signal converter 71 which translates the command into a multitude of output signals, each associated with its respective control element. Two 6-lead unipolar stepper motors are used for positioning of the camera pan and tilt orientations, one rotatable in the lateral plane and one in the vertical plane respectively. Signal converter 71 comprises the commercially available UCN5804B stepper motor driver circuit for position control. In the preferred embodiment, command identification is performed by correlation and data latching means, independently of controller 69. This allows for remote camera control and operation of external functions in a minimum controllerless configuration. Other command identification means are possible including a program running on controller 69.

Controller 69 can be a programmable device such as a microprocessor, RISC processor, Field Programmable Gate Array (FPGA) or any other device known to those skilled in the art of control logic implementation for receiving, storing and replaying command scripts sent from the host processor and performing sequential operations in accordance with Function Programs 78. In the preferred embodiment a PIC 16876 series microcontroller is used due its small size, low power, on-chip memory and favorable performance. Controller 69 is used to perform the data format conversion, rate conversion functions, Reed-Solomon coding, spread spectrum formatting and data buffering operations discussed previously by running an applicable program. It is also used to receive camera orientation commands from the local host processor and to communicate the commands to signal converter 71. Other functions such as password verification, data encryption, image analysis, image processing, power management, autonomous phone dialing, event time logging and other ancillary functions can also be performed therewith. Memory 70 is interfaced to and controlled by controller 69 for buffering camera image data for use in the rate conversion function as well as other controller program functions which require memory. External event interface 72 is included to allow for external event triggers to activate camera functions in accordance with a corresponding program running on controller 69. For example, an intrusion signal derived from an external detector can be used to initiate a command to take a photograph, automatically dial a phone number and forward the image for remote viewing.

Figure 6B:
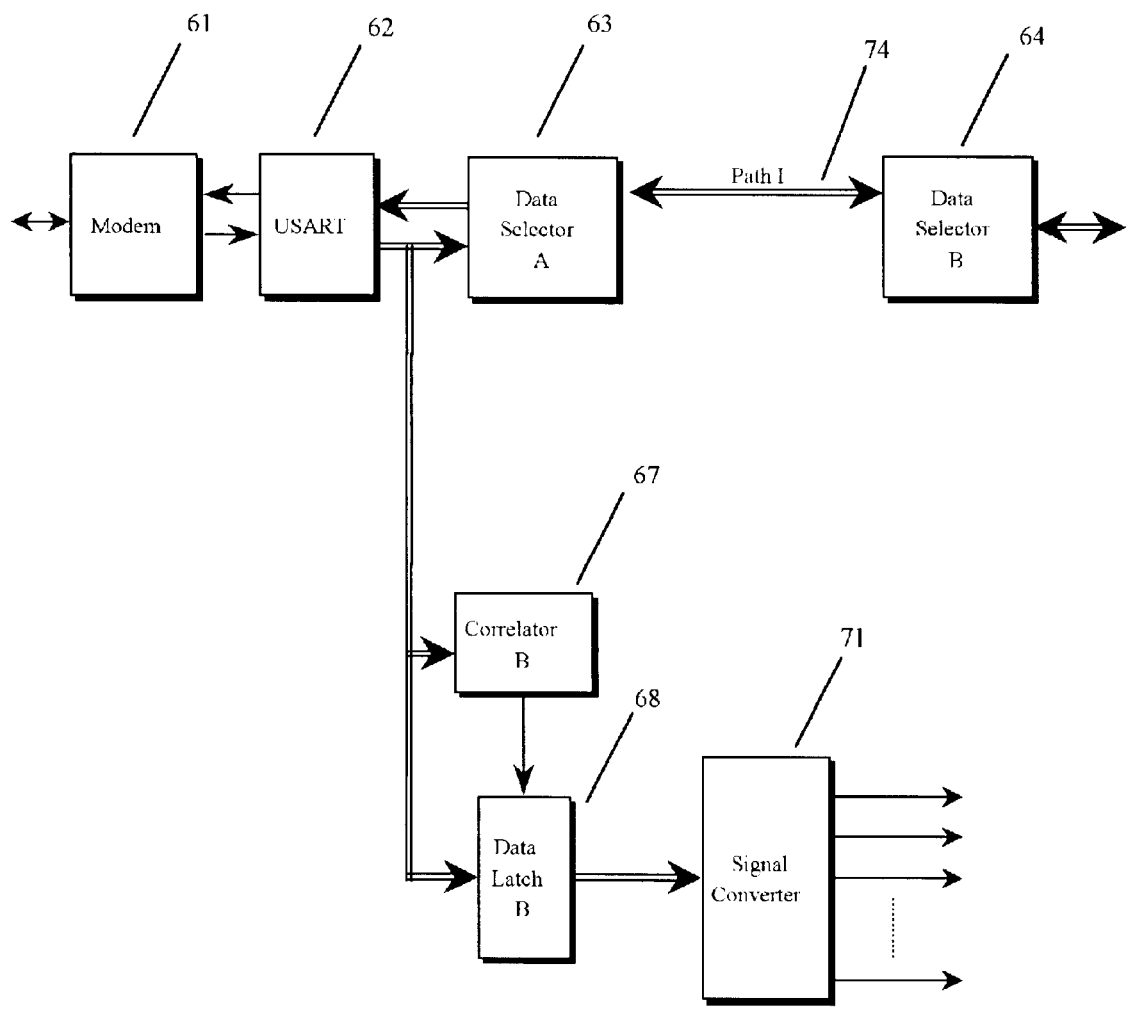

FIG. 6B illustrates a minimum controllerless configuration showing the functional blocks and signal path associated with remote digital camera being controlled directly from the communications link. Commands that are sent by the local host controller arrive at the camera control interface by passing through modem 61, USART 62 data selector-A 63, Path I 74, then through data selector-B 64. Camera orientation commands sent by the local host, are detected by correlator-B 67, data latch-B 68 and are provided to signal converter 71 for control of the camera positioning motors. This mode may be used to instruct the remote camera to take a sequence of photos at different camera orientations without necessarily forwarding the images back to the local host.

Figure 6C:
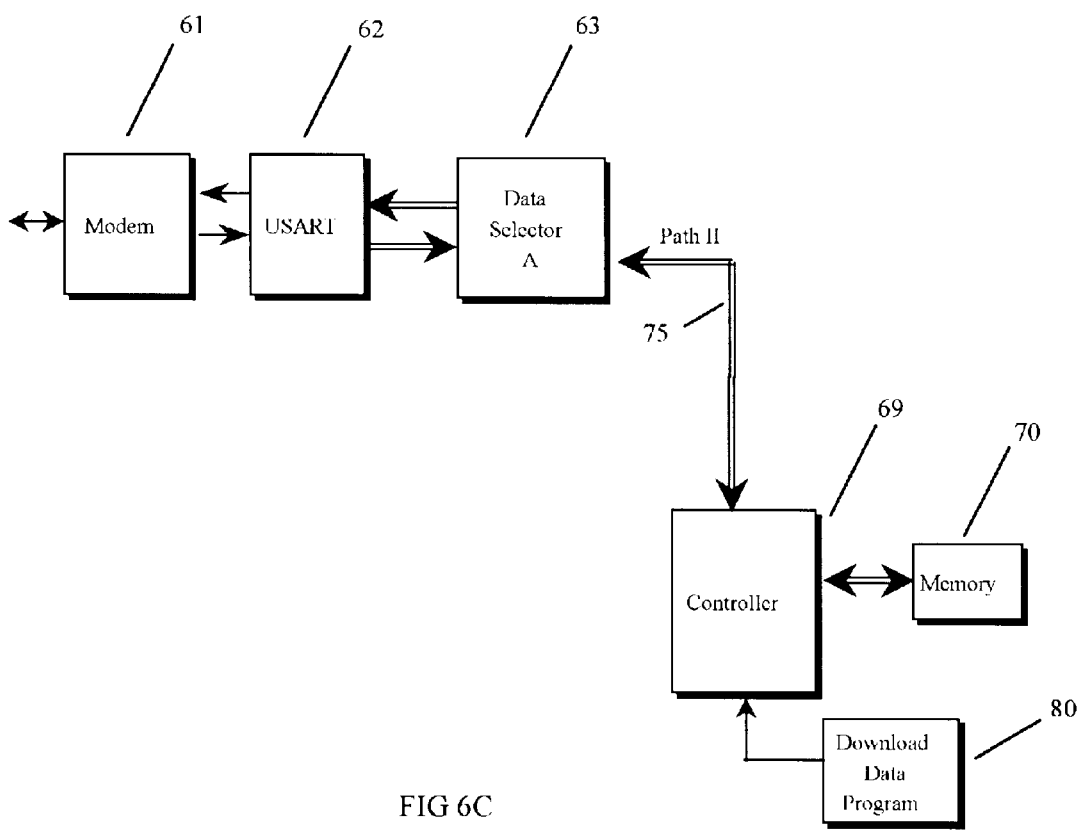
Figure 6D:
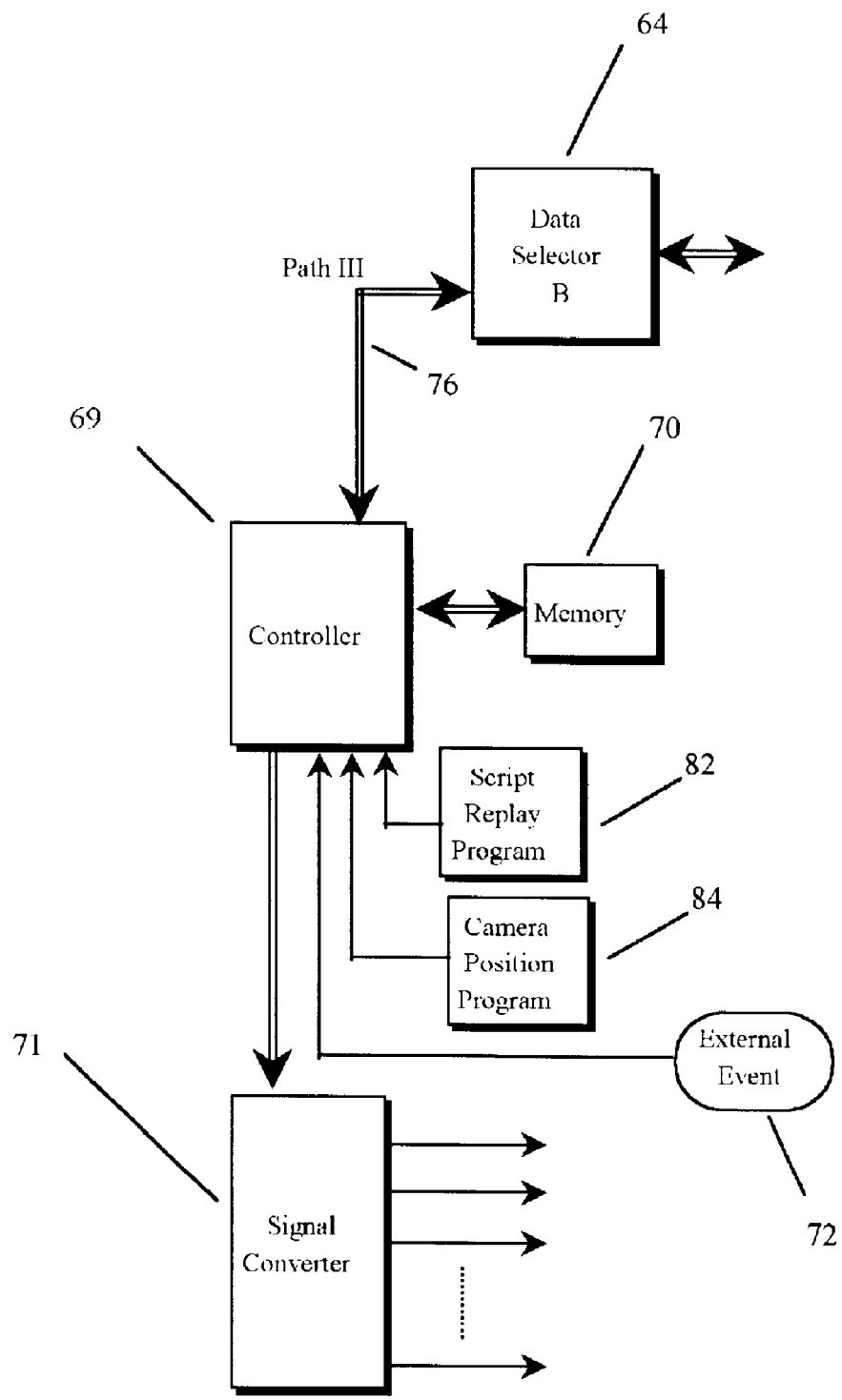
Figure 6E:
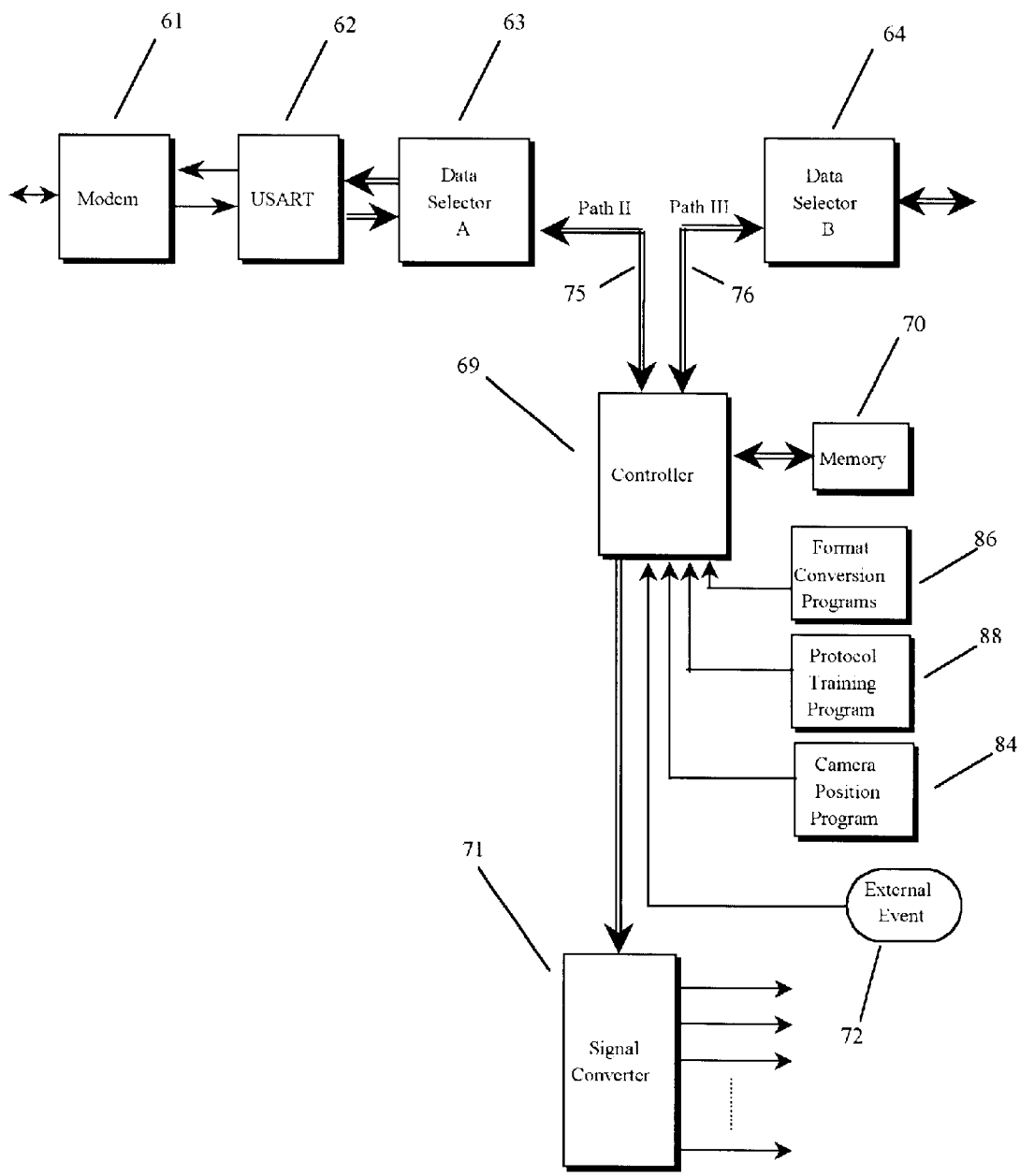

FIG. 6C is a block diagram showing data flow between USART 62 and controller 69 without the use of the digital camera. This configuration is used to remotely pass data from the local host to controller 69 for downloading script command sequences and schedules for automatic camera positioning and photo taking by running Download Data Program 80. In one application, an administrator having authority to grant access permissions can download passwords and camera orientation coordinates to controller 69. With reference to FIG. 6D and FIG. 6E, when an authorized user subsequently wishes to access the remote relay controller, he forwards a password to controller 69. A Camera Positioning Program 84 running on controller 69automatically provides an appropriate signal to signal converter 71 for orienting the remote camera in accordance with its stored associated coordinates. The authorized user can then view only images at which the camera is aimed thereby allowing access only to those portions of scenes for which he has been granted permission.

FIG. 6D shows the components involved in the autonomous operation of the digital camera without use of the communications link. In this configuration, scripts stored in controller 69 are replayed by a Script Replay Program 82 and Camera Positioning Program 84 for commanding the digital camera to take photographs at scheduled times and positions, or as triggered by external events through external event interface 72.

FIG. 6E shows the components used in conjunction with on-line processing operations interceding between the camera interface and communications forwarding function. As previously described, controller 69, running Format Conversion Programs 86, in combination with memory 70 are used to perform rate conversion, error correction coding and data formatting. In this configuration, command and image data pass through Data Selector-A 63, via Path II 75 into controller 69 wherein commands are transparently passed back out from controller 69 via Path III 76, through Data Selector-B 64. In one mode, controller 69 is programmed to run Protocol Training Program 88 to capture, store and associate the command sequence with a function tag as it passes through during on-line operation of the remote camera. For example, the take-photo command could be captured and tagged, then in a subsequent scheduled mode as depicted in FIG. 6D, the take-photo command could be activated off-line. Script Replay Program 82 of FIG. 6D, running on controller 69 does this by accessing the command string associated with the function tag and replaying it through Data Selector-B 64 into the remote camera. This allows for autonomous camera operation without specific knowledge of the format and protocols required by the camera being used.

A protocol training method, implemented as Protocol Training Program 88 of FIG. 6E, for capturing and associating the command sequence with a function tag is accomplished as follows. The local host first notifies controller 69 that a camera command sequence to the remote camera is about-to occur by first sending a function identification tag to the controller followed by a unique trigger command that indicates the pending action. The method for discerning commands intended for the remote camera vs. the relay controller was discussed earlier. The data flow illustrated in FIG. 6E, between Data Selector-A 63 and Data Selector-B 64, over Path II 75 and Path III 76, is intercepted by controller 69 whereby the data byte sequence subsequent to the trigger command is captured and stored in controller 69 or external memory 70. The function identification tag could simply be an index number or memory address location where the command sequence begins. After the command sequence completes, detected by data inactivity after an appropriate timeout period, the controller terminates the capture. In some digital camera protocols, a command/acknowledgement transaction must occur before the camera acts on a command. Acknowledgment blocks returned from the camera could be captured and tagged in the same manner as the originating command. If multiple command and acknowledgement exchanges occur in a transaction, each could be captured and tagged separately. In the autonomous, off-line control configuration of FIG. 6D, a Script Replay Program 82 running on controller 69 could play back the captured command that had been associated with its function tag thereby replicating the same transaction that occurred when in the on-line mode. In situations where multiple commands are separated by camera acknowledgements, the program running on controller 69 can receive the camera acknowledgment block then compare it with the contents of the previously captured tags. After detecting the presence of the appropriate acknowledgement tag, the controller then replays the contents of the next camera control tag in the transaction sequence. Since command and control transactions are relatively short sequences, the protocol training mode terminates after either a sufficiently long timeout period of no data activity, or when long continuous streams of data begins to pass in the return direction indicating that image data is being transmitted. The Largan digital camera used in the preferred embodiment however, only requires single command blocks without requiring acknowledgements from the camera. For example, the take-photo command involves only two bytes in which case only a single tag and corresponding data block is stored and subsequently replayed.

While the invention has been described with reference to certain preferred embodiments thereof, it is understood that the present disclosure has been made only by way of example and that various modifications and other embodiments thereof may be resorted to without departing from the spirit and scope of the invention as hereinafter claimed.

What is claimed is:

1. A camera communications relay apparatus for remote operation of a self-contained digital camera over a communications link wherein said digital camera is located at a remote location and includes an external interface for receiving camera commands and for outputting image data, said camera communications relay apparatus comprising:

remote communications means at said remote location;

local communications means at a local location;

an online mode wherein said remote communications means is communicatively coupled to said local communications means, thereby allowing a data stream to be passed therebetween over said communications link;

an offline mode wherein said remote communications means and said local communications means are communicatively uncoupled;

a photographing schedule;

means for storing said photographing schedule at said remote location;

first command means, coupled to said external interface, for signaling said digital camera to capture and store a photograph therein during said offline mode in accordance with the stored photographing schedule, said digital camera comprising means for retaining the stored photograph therein for non-real-time retrieval at a later time during said online mode;

second command means, coupled to said external interface, for signaling said digital camera to output an image data stream to said external interface thereof at said later time, wherein said image data stream is characterized by a non-real-time digital representation of said stored photograph, and wherein said second command means operates independently of said first command means;

forwarding means for receiving said image data stream from said external interface and providing said image data stream to said remote communications means in a format compatible for forwarding to said local communications means when operating in said online mode, thereby producing a forwarded image data stream at said local location;

host receiving means, at said local location, for accepting said forwarded image data stream;

interface coupling means for coupling said external interface of said digital camera to said camera communications relay apparatus and for decoupling therefrom, wherein said digital camera cooperates with said camera communications relay apparatus when coupled thereto and said digital camera is independently operable in a conventional photographing manner, apart from said camera communications relay apparatus, for capturing and storing photographs therein, when decoupled therefrom.

2. The apparatus of claim 1 further comprising:

an enclosure for accommodating said remote communications means, said first command means, said second command means, said forwarding means and said means for storing said photographing schedule, therein;

attachment means for attaching said digital camera to said enclosure and for detaching therefrom, wherein said enclosure provides a supporting platform for maintaining said digital camera in a photographing position and disposes, said interface coupling means for coupling said external interface to said camera communications relay apparatus, when attached thereto, and said digital camera is independently operable, apart from said enclosure for capturing and storing photographs therein, when detached therefrom.

3. The apparatus of claim 1 further comprising means for producing said photographing schedule at said local location and providing said photographing schedule to said local communications means thereby forwarding said photographing schedule to said remote location in accordance with said online mode.

4. The apparatus of claim 1 further comprising third command means for signaling said digital camera to delete said stored photograph therefrom.

5. The apparatus of claim 1 wherein said communications link comprises a telephone network, said local communications means comprises a local modem and said remote communications means comprises a remote modem.

6. The apparatus of claim 1 wherein said communications link comprises a wireless link, said remote communications means comprises a remote wireless transceiver and said local communications means comprises a local wireless transceiver.

7. The apparatus of claim 1 further comprising means for generating camera command data at said local location and providing said camera command data to said local communications means for forwarding to said remote communications means in said online mode, thereby producing remote camera command data at said remote location, and further comprising means for forwarding said remote camera command data to said external interface of said digital camera in a format compatible with the operation thereof, thereby causing said digital camera to respond in accordance with said camera command data during said online mode.

8. The apparatus of claim 7 further comprising protocol training means, said protocol training means comprising:

memory means;

command capture means wherein said remote camera command data is captured in said memory means in said online mode;

means for associating the captured remote camera command data with its corresponding camera function;

means for selecting said camera function in said offline mode;

means for outputting said captured remote camera command data to said external interface in accordance with the selected camera function in said offline mode.

9. A camera communications relay apparatus for remote operation of a self-contained digital camera over a communications link wherein said digital camera is located at a remote location and includes an external interface for receiving camera commands and for outputting image data, said camera communications relay apparatus comprising:

remote communications means at said remote location;

local communications means at a local location;

an online mode wherein said remote communications means is communicatively coupled to said local communications means, thereby allowing a data stream to be passed therebetween over said communications link;

an offline mode wherein said remote communications means and said local communications means are communicatively uncoupled;

a photographing schedule;

means for storing said photographing schedule at said remote location;

first command means, coupled to said external interface, for signaling said digital camera to capture and store a photograph therein during said offline mode in accordance with the stored photographing schedule, said digital camera comprising means for retaining the stored photograph therein for non-real-time retrieval at a later time during said online mode;

second command means, coupled to said external interface, for signaling said digital camera to output an image data stream to said external interface thereof at said later time, wherein said image data stream is characterized by a non-real-time digital representation of said stored photograph, and wherein said second command means operates independently of said first command means;

third command means for generating a camera positioning command at said remote location, said camera positioning command corresponding to a selected camera field-of-view;

camera positioning means for orienting said digital camera in response to said camera positioning command thereby positioning said digital camera to said selected camera field-of-view, wherein said photograph produced by said first command means corresponds to said selected field-of-view;

forwarding means for receiving said image data stream from said external interface and providing said image data stream to said remote communications means in a format compatible for forwarding to said local communications means when operating in said online mode, thereby producing a forwarded image data stream at said local location;

host receiving means, at said local location, for accepting said forwarded image data stream;

attachment means for supportively attaching said digital camera to said camera positioning means and for detaching therefrom;

interface coupling means for coupling said external interface to said camera communications relay apparatus and for decoupling therefrom;

wherein said digital camera cooperates with said camera communications relay apparatus when supportively attached and coupled thereto and said digital camera is independently operable in a conventional photographing manner, apart from said camera communications relay apparatus, for capturing and storing photographs therein, when detached and decoupled therefrom.

10. The apparatus of claim 9 further comprising an enclosure for accommodating said remote communications means, said first command means, said second command means, said third command means, said forwarding means and said means for storing said photographing schedule and said camera positioning means, therein, wherein said enclosure provides a supporting platform for maintaining said digital camera in a photographing position and disposes said interface coupling means for coupling said external interface to said camera communications relay apparatus when said digital camera is attached to said camera positioning means.

11. The apparatus of claim 9 wherein said camera positioning means comprises motor means for rotating said attachment means in a lateral plane and a vertical plane thereby producing panning and tilting motion of said digital camera when attached thereto.

12. The apparatus of claim 9 further comprising position access control means for selectively orienting said camera positioning means in accordance with permissions, thereby orienting said digital camera to allowable field-of-views when said digital camera is attached to said camera positioning means, whereby the capture and storage of photographs is restricted to said allowable field-of-views.

13. The apparatus of claim 9 wherein said photographing schedule includes predetermined photographing times and predetermined camera orientations corresponding to said predetermined photographing times, and wherein said first command means is responsive to said predetermined photographing times and said third command means is responsive to said predetermined camera orientations, thereby causing said digital camera to capture and store photographs corresponding to said predetermined camera orientations at said predetermined photographing times in said offline mode.

14. The apparatus of claim 13 further comprising means for producing said photographing schedule at said local location and providing said photographing schedule to said local communications means thereby forwarding said photographing schedule to said remote location in accordance with said online mode.

15. A camera communications relay apparatus for remote operation of a self-contained digital camera over a communications link wherein said digital camera is located at a remote location and includes an external interface for receiving camera commands and for outputting image data, said camera communications relay apparatus comprising:

remote communications means at said remote location;

local communications means at a local location, communicatively coupled to said remote communications means;

a data streaming mode wherein said remote communications means and said local communications means are configured for passing a data stream from said remote location to said local location over said communications link in a format characterized by an uninterrupted transfer of successive data elements without data retransmission;

first command means for signaling said digital camera to capture and store a photograph therein;

second command means for signaling said digital camera to output an image data stream to said external interface thereof, wherein said image data stream is characterized by a digital representation of said stored photograph;

an FEC encoder at said remote location, provided with said image data stream, for producing an FEC encoded data stream therefrom;

forwarding means for providing said FEC encoded data stream to said remote communications means for forwarding to said local communications means in accordance with said data streaming mode, thereby producing a forwarded FEC encoded data stream at said local location;

an FEC decoder at said local location, said FEC decoder corresponding to said FEC encoder for correcting transmission errors in said forwarded FEC encoded data stream, thereby producing a corrected image data stream at said local location;

host receiving means at said local location for receiving said corrected image data stream;

interface coupling means for coupling said external interface of said digital camera to said camera communications relay apparatus and for decoupling therefrom, wherein said digital camera cooperates with said camera communications relay apparatus when coupled thereto and said digital camera is independently operable in a conventional photographing manner, apart from said camera communications relay apparatus, for capturing and storing photographs therein, when decoupled therefrom;

whereby said FEC encoder, said FEC decoder and said data streaming mode, in combination, provides a protocol-free transmission of data from said digital camera to said local host receiving means, thereby eliminating the need for camera-specific transmission protocol processing and allowing for the universal adaptation of an arbitrary digital camera for remote image access.

16. The apparatus of claim 15 wherein said FEC encoder and said FEC decoder comprise a Reed Solomon encoder and a Reed Solomon decoder, respectively.

17. The apparatus of claim 15 wherein said remote communications means is a remote modem, said local communications means is a local modem, and said remote modem and said local modem are configured in accordance with said data streaming mode wherein data retransmission between said local modem and said remote modem is inhibited.

18. The apparatus of claim 15 wherein said communications link comprises a wireless link, said remote communications means comprises a wireless transmitter and said local communications means comprises a wireless receiver.

19. The apparatus of claim 15 further comprising:

an offline mode wherein said remote communications means and said local communications means are communicatively uncoupled;

a photographing schedule;

means for storing said photographing schedule at said remote location;

and wherein said first command means is responsive to said photographing schedule thereby commanding said digital camera to capture and store photographs therein in accordance with said schedule when operating in said offline mode.

20. The apparatus of claim 15 further comprising:

an enclosure for including said remote communications means, said first command means, said second command means, said FEC encoder and said forwarding means, therein;

attachment means for attaching said digital camera to said enclosure and for detaching therefrom, wherein said enclosure provides a supporting platform for maintaining said digital camera in a photographing position and disposes said interface coupling means for coupling said external interface to said camera communications relay apparatus when attached thereto, and said digital camera is independently operable in a conventional photographing manner, apart from said enclosure for capturing and storing photographs therein, when detached therefrom.

\* \* \* \* \*